S. A. SKOOG.
TRAIN PIPE COUPLING.
APPLICATION FILED OCT. 24, 1919.

1,372,566.

Patented Mar. 22, 1921.

Inventor
S. A. Skoog.

By Geo. P. Kimmel
Attorney

UNITED STATES PATENT OFFICE.

SIGURD A. SKOOG, OF GLADSTONE, MICHIGAN.

TRAIN-PIPE COUPLING.

1,372,566.  Specification of Letters Patent.  Patented Mar. 22, 1921.

Application filed October 24, 1919. Serial No. 332,922.

*To all whom it may concern:*

Be it known that I, SIGURD A. SKOOG, a citizen of the United States, residing at Gladstone, in the county of Delta and State of Michigan, have invented certain new and useful Improvements in Train-Pipe Couplings, of which the following is a specification.

This invention has for its object to provide a coupling especially designed for application to railway cars for automatically establishing communication between the air pipes of two adjacent railway cars when the latter are coupled together.

Another object is the provision of an automatic coupling for train pipes having a novel type of valve which is automatically actuated by contact with the companion coupling member carried by an adjacent car to control the passage of fluid through the coupling.

Another object is the provision of an effective sealing element which is applied to the terminal of the body of the coupling and coacts with the sealing element of the adjacent coupling member to establish a fluid tight joint.

A still further object is the provision of means for yieldably and movably supporting the coupling in such manner as to permit the necessary relative movement of the cars during movement of the latter over curved tracks.

With these and other objects in view as will appear as the description proceeds, the invention comprises the novel features of construction, combination and arrangement of parts as will be more fully described in the following specification and set forth with particularity in the claim appended hereto.

Figure 1:
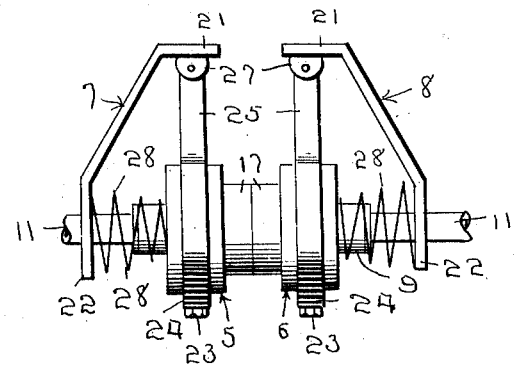
Figure 1 represents a side elevation of the complete coupling detached, and partly broken away.
Figure 2:
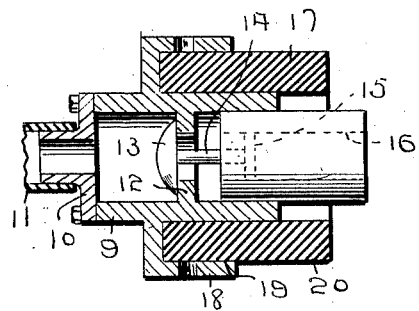
Fig. 2 represents a vertical sectional view through one of the coupling members, the supporting bracket being removed.
Figure 3:
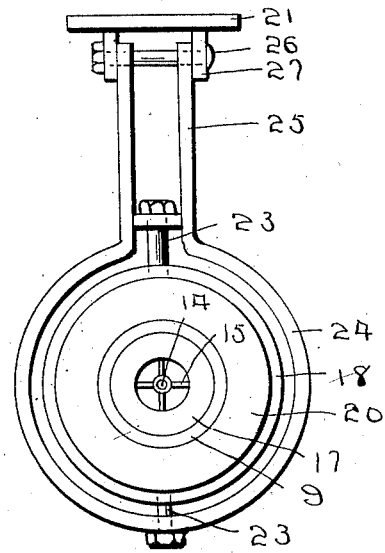
Fig. 3 represents an end elevation of one of the coupling members illustrating the supporting bracket therefor in detail.

Referring to the drawings in detail, wherein similar reference numerals designate corresponding parts throughout the several views, the numerals 5 and 6 indicate companion members of the improved coupling which are independently supported in supporting brackets designated generally by the numerals 7 and 8, respectively attachable to the terminal portions of railway cars. The structure of both coupling members and supporting brackets being identical detail descriptions of one will suffice for both. Referring particularly to the coupling member 5 and having reference to the several parts thereof by numerals of reference it will be understood that the same reference numerals are applied to corresponding parts of the other coupling member 6.

The coupling member 5 comprises a hollow cylindrical body 9 having a pipe coupling 10 bolted or otherwise rigidly secured to one terminal thereof upon which is detachably fitted a flexible air pipe 11 whereby air is conducted to the body 9 from the air brake system of a railway car (not shown). Intermediate its terminals, the hollow body 9 is formed with an internal valve seat 12 which is controlled by a valve 13 carried by a stem 14 rigidly secured to a spider 15 arranged in the bore 16 of a hollow plunger 17. The plunger is reciprocably mounted in the terminal of the hollow body 9 opposite the pipe coupling 10 and is designed to be acted upon by the pressure of the outflowing fluid through the body when the valve 13 is open to cause outward movement of the plunger and the corresponding closing movement of the valve 13.

The body 9 is formed with an external annular flange 18 providing a groove 19 receiving the circular sealing element 20 which is preferably constructed of rubber or such other material having equivalent resilient and elastic qualities in order to provide an effective seal between two of the members of the coupling when the latter is properly assembled. The plunger 17 projects a short distance beyond the terminal of the circular sealing element 20 but sufficient, however, as to cause engagement of the plungers of two companion coupling members preliminary to the contact of the sealing elements 20 to effect automatic opening of the valves 13 of the respective coupling elements and thereby establishing communication between them permitting the air standing in the pipe 11 to pass through the coupling and enter the newly coupled car.

Each of the supporting brackets designated generally by the numerals 7 and 8 comprises an attaching plate 21 which may be applied by bolts or similar fastening means to an adequate portion of the terminal of a railway car and is provided with an obliquely extending and depending arm 22 having a slotted lower terminal receiving the flexible air pipe 11. The flanged portion of the body 9 is provided with vertically alined pivot pins 23 which are pivotally mounted in diametrically opposed portions of the substantially circular terminal portion 24 of a hanger 25 the upper extremities of which are provided with a pivot pin 26 mounted and supported in a pair of depending ears 27 arranged upon the lower surface of the attaching plate 21. The pivot pins 26 for the respective members of the coupling are arranged at right angles to the longitudinal axis of the railway car to which the coupling is applied consequently permitting limited swinging movement of the coupling member in the direction of the longitudinal axis of the car. Expansion coiled springs 28 are confined between the lower terminals of the arms 22 and the coupling members 9 and normally retain the latter in suspended position to insure positive engagement of the sealing elements 20 whereby the fluid is prevented from escaping at the joints between the coupling members, when the latter are coupled together.

What I claim is:

In combination, a supporting bracket provided with a slotted depending arm, a coupling member comprising a body, a hanger pivotally suspended on a horizontal axis from the bracket, means pivotally supporting the body in the lower terminal of the hanger and arranged in angular relation to the pivotal axis of the latter to permit the coupling member to swing in a horizontal plane, a flexible pipe connected with the coupling member and passing through the slotted arm, and a helical spring seated at its relatively large end against the lower extremity of the depending arm and engaged at its opposite end with the body and normally retaining the latter in outwardly projected position.

In testimony whereof, I affix my signature hereto.

SIGURD A. SKOOG.